US010171518B2

(12) United States Patent
Lindström et al.

(10) Patent No.: US 10,171,518 B2
(45) Date of Patent: Jan. 1, 2019

(54) PERFORMING AN ACTION ON CERTAIN MEDIA STREAMS IN A MULTIMEDIA COMMUNICATIONS NETWORK

(71) Applicant: Telefonaktiebolaget LM Ericsson (publ), Stockholm (SE)

(72) Inventors: Michael Lindström, Tullinge (SE); Arturo Martin de Nicolas, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 15/028,816

(22) PCT Filed: Oct. 9, 2014

(86) PCT No.: PCT/EP2014/071641
§ 371 (c)(1),
(2) Date: Apr. 12, 2016

(87) PCT Pub. No.: WO2015/055496
PCT Pub. Date: Apr. 23, 2015

(65) Prior Publication Data
US 2016/0261644 A1    Sep. 8, 2016

Related U.S. Application Data

(60) Provisional application No. 61/891,060, filed on Oct. 15, 2013.

(51) Int. Cl.
*G06F 15/16* (2006.01)
*H04L 29/06* (2006.01)
*H04L 29/08* (2006.01)

(52) U.S. Cl.
CPC .......... *H04L 65/1066* (2013.01); *H04L 65/10* (2013.01); *H04L 65/103* (2013.01);
(Continued)

(58) Field of Classification Search
CPC ........... H04L 65/1006; H04L 29/06027; H04L 65/105; H04L 65/1066; H04L 65/1023
(Continued)

(56) References Cited

U.S. PATENT DOCUMENTS

2003/0231639 A1    12/2003    Mikkola
2003/0236912 A1 *  12/2003    Klemets .................. H04L 29/06
                                                              709/236

FOREIGN PATENT DOCUMENTS

CN         101631109 A      1/2010
WO         2013004309 A2    1/2013
WO    WO 2013004309 A2 *    1/2013    ......... H04L 65/1043

OTHER PUBLICATIONS

Holmberg, C., et al., "Multiplexing Negotiation Using Session Description Protocol (SDP) Port Numbers", MMUSIC Working Group, Internet-Draft, Jun. 14, 2013, pp. 1-26, IETF.
(Continued)

*Primary Examiner* — Wing F Chan
*Assistant Examiner* — Andrew Woo
(74) *Attorney, Agent, or Firm* — Coats & Bennett, PLLC (57) ABSTRACT

The invention proposes controlling a media session involving a plurality of media streams within a communications network, wherein the communications network comprises a media resource node (106) and a media control node controlling (102) the media resource node, wherein the media control node performs a method of determining that selected media streams out of the plurality of media streams are associated to each other in a media session, transmitting to the media resource node (106) an instruction to group the selected media streams of the media session, and transmitting to the media resource node (106) an instruction to prepare for performing an action with respect to the selected media streams. The invention further proposes a correspond-
(Continued)

ing method to be performed in a media resource node (106), corresponding nodes (102, 106) and corresponding computer programs.

18 Claims, 5 Drawing Sheets

(52) U.S. Cl.
CPC ...... *H04L 65/1006* (2013.01); *H04L 65/1023* (2013.01); *H04L 65/1043* (2013.01); *H04L 65/1069* (2013.01); *H04L 65/1083* (2013.01); *H04L 65/4015* (2013.01); *H04L 65/60* (2013.01); *H04L 65/80* (2013.01); *H04L 67/1095* (2013.01); *H04L 67/146* (2013.01)

(58) Field of Classification Search
USPC .......................................................... 709/217
See application file for complete search history.

(56) References Cited

OTHER PUBLICATIONS

Westerlund, M. et al., "Using Simulcast in RTP Sessions", Network Working Group Internet-Draft, Jul. 4, 2014, pp. 1-22, IETF.

Camarillo, G. et al., "The Session Description Protocol (SPD) Grouping Framework" IETF Request for Comments: 5888, Jun. 1, 2010, pp. 1-21, IETF.

Telecommunication Standardization Sector, "H.248.RTPMUX "Gateway Control Protocol: H.248 support for RTP multiplexing" (New): Output draft", Rapporteur Meeting Document, TD-24, Study Group 16, Jun. 17, 2013, pp. 1-22.

Telecommunication Standardization Sector of ITU, "Series H: Audiovisual and Multimedia Systems; Infrastructure of audiovisual services—Communication procedures; Gateway control protocol: Version 3", H.248.1, Mar. 1, 2013, pp. 1-247, ITU.

\* cited by examiner

```
MEGACO/3 [123.123.123.4]:55555
Transaction = 10000 {
    Context = 1 {
        Add = T? {
            Media {
                TermationState { mgroup/groupse =
                    "FID 1 2" mgroup/grouprep = 8},
                Stream = 1 {
                    Local {
                        c=IN IP4 $
                        m=audio $ RTP/AVP 0
                    }
                }
                Stream = 2 {
                    Local {
                        c=IN IP4 $
                        m=audio $ RTP/AVP 0
                    }
                }
            }
        }
    }
}
```

Fig.5a

```
MEGACO/3 [123.123.123.4]:55555
Transaction = 10000 {
    Context = 1 {
        Mod = T1 {
            Signals { an/apv{ST=8,an=0x0023}}
        }
    }
}
```

Fig.5b

```
Media {
    TerminationState { mgroup/groupse = "FID 1 2 3",
  mgroup/groupreptop = 1},
    Stream = 1 {
      Local {
         c=IN IP4 $
         m=audio $ RTP/AVP 0
         a=sendrecv
      }
    },
    Stream = 2 {
      Local {
         c=IN IP4 $
         m=audio $ RTP/AVP 98
         a=rtpmap:98 AMR/8000
         a=fmtp:98 mode-set=0,2,5,7; mode-change-period=2; \
         mode-change-neighbor = 1; mode-change-capability=2;
  max-red=0
      a=sendrecv
      }
    },
    Stream = 3 {
      Local {
         c=IN IP4 $
         m=audio $ RTP/AVP 0
         a=sendonly
      }
    }
}
```

Fig.6a

```
Media {
     Stream = 1 {
       LocalControl {
          ReservedValue = ON
       }
       Local {
          c=IN IP4 $
          m=audio $ RTP/AVP 0 98
          a=rtpmap:98 AMR/8000
          a=fmtp:98 mode-set=0,2,5,7; mode-change-period=2; \
          mode-change-neighbor = 1; mode-change-capability=2;
   max-red=0
          a=sendrecv
       }
     }
}
```

Fig.6b

PERFORMING AN ACTION ON CERTAIN MEDIA STREAMS IN A MULTIMEDIA COMMUNICATIONS NETWORK

TECHNICAL FIELD

The present invention relates to media handling in multimedia communications networks, and specifically relates to an interaction involving a session control protocol and a media gateway protocol.

BACKGROUND

Modern communication networks often show a "decomposed" or layered architecture, in which the call and session control layer and the media plane layer are handled by different instances that are typically realized as separated physical nodes. Typically the nodes of the call and session control layer are referred to as media gateway controllers and the nodes of the media plane layer are referred to as media gateways.

A protocol widely used in the control layer for controlling sessions consisting of one or several media streams is the Session Initiation Protocol SIP being specified in the Internet Engineering Task Force document "IETF RFC 3262, Session Initiation Protocol" in the following being referred to as RFC 3262.

A further protocol defined by the IETF, the Session Description Protocol SDP specified in the IETF document RFC 4566, is used in a variety of networks and communications systems for describing multimedia sessions, e.g. for the purpose of session announcement, session invitation and other forms of multimedia session initiation. Examples of such networks are the IP Multimedia Subsystem—IMS- and the Multimedia Telephony Service—MMTel-. The SDP is thereby used in combination with the SIP in a way that SDP messages or packages are embedded into SIP.

Since its origins, SDP has evolved with new capabilities to respond to the needs of new applications, as corresponds to a constantly growing use of the protocol. A capability to group different media has been specified for different applications in various IETF documents. By means of media grouping in SDP, a particular relationship between two or more media streams can be indicated.

The framework for grouping of media is specified in the IETF document RFC 5888 that also specifies specific applications for the use of this capability, and further in the IETF document RFC 4588 titled "The Session Description Protocol (SDP) Grouping Framework".

According to the RFC 5888, a plurality of media streams may be grouped together. Depending on the type (semantics) of the grouping, certain actions which would otherwise be handled individually per stream may be required on the complete group of streams. In the following, some examples are given:

An announcement (video and/or audio) shall be sent simultaneously to two grouped (video and/or audio) media streams When several grouped media streams traverse a node, for example a media mixer, the input and output stream end points of the node may have to be connected in such a way that several grouped media streams at one end point are mapped into one single media stream at the other end point.

Statistics: for some streams that are grouped together according to the "BUNDLE" semantics it may be required to collect statistics (e.g. received octets) for all of them together, rather than for each of them individually.

Events: for some streams that are grouped together (e.g. using so-called flow Identification, FID, semantics), it may be desired to arm the detection of incoming digits (eDTMF or telephony events) simultaneously in all grouped streams.

One example for a protocol to be used between the control nodes and the media plane nodes is specified in ITU-T Recommendation H.248.1, titled Gateway Control Protocol (current Version 3), in the following also being referred to as media gateway control protocol or simply as H.248.

In a decomposed gateway, the actions above are controlled by MGC instructions e.g. instructions according to the H.248 protocol.

Patent application PCT/EP2011/061462 of the same applicant discloses a method to initiate a media session within a communications network involving a plurality of media streams, wherein the communications network comprises a plurality of media control nodes (media gateway controllers) and a plurality media resource nodes (media gateways) being controlled by each one of the media control nodes. Thereto, a certain media control nodes instructs a media resource node being controlled by that media control nodes to associate or group two or more of the media streams, e.g. a subset of all streams handled by a termination of the media resource node.

This allows a control layer node (a media gateway controller or MRFC) to instruct a node of the media layer (a media gateway or a MRFP), by means of a corresponding session description, to create appropriate media stream sinks and sources (such logical entities also being referred to as terminations within the H.248 terminology) for handling multiple media streams and grouping corresponding two or more of these media streams. Thus controlling a grouping (or association) of different media streams of multimedia applications like videoconference and so-called telepresence might be accomplished involving a plurality of media gateway controllers and a corresponding plurality of media gateways.

Example for use cases are:

Synchronized play out of a video and an audio stream (lip-synchonization, LS) or of an audio stream and its simultaneous translation (LS semantics are defined in RFC 5888).

Use of a redundancy media stream for error protection purposes (the original stream and the redundancy stream may use the FID media grouping semantics, as defined in RFC 4888).

Use of one or more Forward Error Correction streams (the original stream and the forward error correction stream(s) may use the FEC media grouping semantics, as defined in RFC 4756).

The FID semantics may also be used to group multiple audio streams which use different audio codecs. Only one of them is used at a time. The streams with the ones not used remain silent during that time. In another use of the FID semantics, if two of these streams use the same audio codec, a replica of the media is sent is sent in the stream with the same codec (as specified in RFC 5888).

Two or more media streams may use the same source and destination IP addresses and ports. These media grouping semantics is called BUNDLE and is e.g. being specified in the draft-ietf-mmusic-sdp-bundle-negotiation IETF draft.

Multiple video streams with the same content, but with different resolutions may be grouped together with a simulcast media grouping.

However, not always all streams associated to one termination within the gateway are to be grouped. There may be situations wherein only a subset of such media streams shall be grouped. However, current protocols for the control of media gateways do not allow commanding certain actions, such as those previously listed regarding playout of signals, detection of events, collection of statistics, on a stream group when such partial grouping exists. Furthermore, for some grouping semantics the realization of a signal, event or statistics in the group of streams may not be identical to the realization of such signal, event or statistic in every individual stream of the group. In such case, current protocols also do not allow commanding such signal, event or statistics in the group of streams. Furthermore, current protocols do not allow commanding the establishment of certain forms of connectivity if the same grouping is not defined at the other side of the connection, i.e. in the other termination.

Specifically, H.248 does not allow applying a signal simultaneously to several media streams in a termination unless it is applied to all media streams of the termination. Further, H.248 does not allow arming an event simultaneously in several streams in a termination unless it is armed in all media streams of the termination. There is further no mechanism to combine (aggregate) statistics on several streams in a termination (unless it is done on all streams of the termination).

There is no mechanism to connect both-way or one-way two or more streams at one side with one single stream at the other side (unless the node applies multiplexing). The mechanism used in H.248 to specify the connectivity between the stream end points is the topology. It may be noticed that H.248 supports the mixer case where several stream end points are connected to each other, normally with both-way topology, but in that case every end point handles the same number of streams.

SUMMARY

It is an object of the present invention to improve a grouping of a plurality of media streams in a decomposed multimedia network comprising a media control layer being separated from a media plane (also being referred to as bearer or connectivity) layer.

According to an embodiment, a media session within a communications network is initiated and/or controlled involving a plurality of media streams, wherein the communications network comprises a plurality of media control nodes e.g. so-called media gateway controllers, MGC, and a plurality media resource nodes so-called media gateways, MG, being controlled by each one of the media control nodes, wherein one of the media control nodes instructs a media resource node being controlled by that media control nodes to associate or group two or more of the media streams constituting a subset of all streams handled by a termination of the media resource node.

In an embodiment, the media control node determines that selected media streams out of the plurality of media streams are associated to each other in a media session, and transmits an instruction to group the selected media streams of the media session.

In a further embodiment, the media control node further transmits an instruction to prepare for performing an action with respect to the selected media streams.

In a further embodiment, the media control node transmits an instruction to perform the action with respect the selected media streams to the media resource node. Transmission may be performed together or subsequently with the media stream grouping instruction (i.e. during an initialization stage to setup termination/media streams in the media resource node) or during runtime (i.e. a certain time later after the initialization phase has been accomplished).

In a further embodiment, the instruction to group the selected media streams comprises a list of media stream identifiers, e.g. integer numbers, created at the media resource node.

In a further embodiment the instruction to prepare for performing an action with respect to the selected media streams comprises a media stream identifier representing the group of selected media streams.

In an embodiment, a stream representative is specified, that acts as a virtual stream in the sense that if the media gateway controller instructs the media gateway to perform an action with respect to selected media streams; e.g.

if the MGC orders the MG to play a signal in the stream representative, the signal will be played in all the grouped streams.

if the MGC orders the MG to arm an event on the stream representative, the event will be armed in all the grouped streams     if the MGC orders the MG to collect statistics in the stream representative, the statistics will be collected and aggregated in all grouped streams.

if the MGC orders the MG to establish a certain topology using the stream representative, the topology will affect also all grouped streams. However when the media in each of the grouped streams has to traverse from/to one termination to another termination, depending on the semantics of the grouping, not all streams will necessarily traverse. The semantics of the grouping may imply that only one of them is chosen at a time, and this may change dynamically without requiring MGC intervention.

According to embodiments of the invention, telecommunications applications like video conference, telepresence systems, are enabled to perform a grouping in a layered architecture having separate media control and media connectivity layers, e.g. by applying a mapping of information elements of the Session Description Protocol into as mentioned in the introductory section.

In a further embodiment, in a videoconference scenario, a grouping is performed comprising a high quality video and a standard quality video of the same content to be simultaneously transmitted to the same participant e.g. to suit different capabilities of different receivers of this participant.

In a further embodiment, a video streaming application sends original media and a replica being grouped in order to increase robustness and/or the quality.

The present invention also concerns computer programs comprising portions of software codes in order to implement the method as described above when operated by a respective processing unit of a media control node or a media resource node. The computer program can be stored on a computer readable medium. The computer-readable medium can be a permanent or rewritable memory within the user device or the recipient device or located externally. The respective computer program can be also transferred to the respective node for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
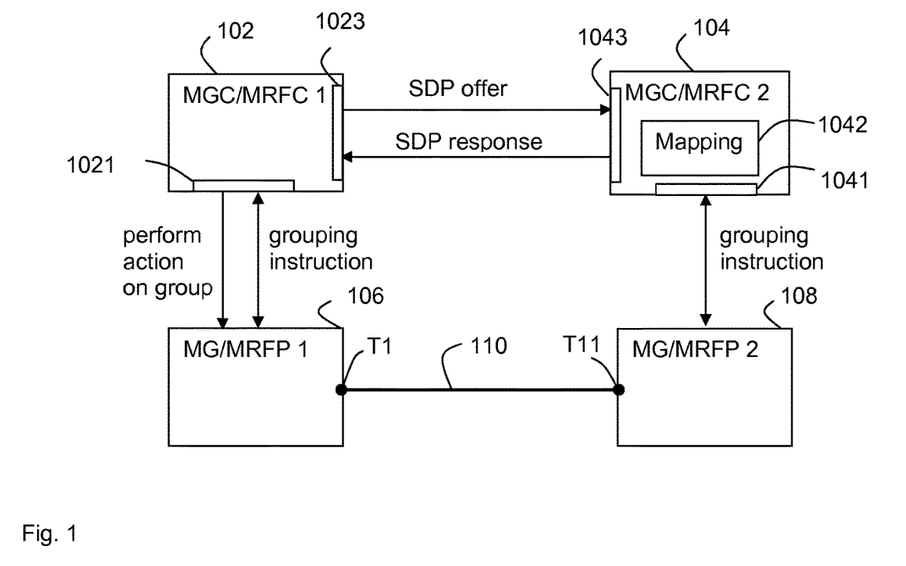
FIG. 1 shows a principle block diagram comprising nodes being involved in media control being performed e.g. on the basis of SDP and H.248.

FIG. 1 shows a principle block diagram of a part of a multimedia communications network, by way of example comprising a first media resource controller (or media gateway controller, MGC) 102, a second media resource controller 104, a first resource point (or media gateway, MG) 106 and a second resource point 108. By way of example, first resource point or MG 106 comprises a first termination T1, and second resource point or MG 108 comprises a further termination T11 that are coupled to each other to form a communication channel 110 within the media layer. By way of example, first media resource controller 102 and second media resource controller 104 communicate by means of above-mentioned SIP protocol and first (second) media resource controller 102 (104) communicates with first (second) resource point 106 (108) by means of a protocol according to H.248 enhanced according to embodiments to the invention (also being referred to as enhanced H.248 in the following).

Each termination T1 and T11 may be a media stream sink and/or media stream source that might each be characterized by address(es) (e.g. an IP address), port number(s) and type(s) of media. By way of example, the first media resource controller 102 communicates with the first resource point 106 by sending a command (e.g. "add") to instruct a creation of the first termination T1 for handling a plurality of (e.g. three) media streams and receiving a reply associated to the command (e.g. "add reply"). The command may comprise an order to group all the media streams or a subset of the media streams (e.g. two of three media streams). This command might be provided by means of the H.248 protocol.

Additionally, the first media resource controller 102 may send a corresponding offer (e.g. "SDP offer") comprising a corresponding session description comprising a description of the plurality of media and the grouping information to the second media resource controller 104. The second media resource controller 104 might accept the offer by a reply (e.g. "SDP answer"). Corresponding to the communication between the first media resource controller 102 and the first resource point 106, the second media resource controller 104 generates a command (e.g. "add") to creating the further first termination T11 of the second MG 108 on the basis of the SDP offer received from the first media resource controller 102.

The first media resource controller 102 may comprise a first H.248 interface (circuit) 1021 for providing an H.248 interface to the first media resource point 106 and a first SDP interface (circuit) 1023 for providing and SDP interface to the second media resource controller 104. Similarly, the second resource controller 104 comprises corresponding second H.248 and SDP interfaces 1041 and 1041.

In the example of FIG. 1 the second resource controller 104 may further comprise a translation or mapping unit 1042 for performing a mapping of the session description carried by the offer received from another resource controller (e.g. the first media resource controller 102). The mapping unit detects the plurality of media and the grouping information from the offer, determines that these (or some of these) media are associated to the corresponding termination T11 and generates an instruction comprising a media stream description of all involved media (Stream Descriptors) and a grouping information as part of a termination state description associated to the second termination. Thus, according to the example of FIG. 1, the mapping performs a translation from the media offer received from the first media resource controller 102 to an instruction to be transmitted to the (second) resource point 108.

The grouping instruction each sent from the resource controller (e.g. first or second resource controller 102, 104) to the respective resource point (e.g. first or second resource point 106, 108) comprises in indication to group selected media streams into a group. Further, the grouping instruction may comprise a stream representative as discussed above. The stream representative acts as a virtual stream specifying the (real) selected streams handled at the MG that are grouped by way of the commands described above.

If the resource controller instructs the associated resource point to perform a certain action associated with the stream representative, the resource point will perform the commanded action simultaneously to all grouped streams. Such action may be to play a signal in all the grouped streams. to arm an event in all the grouped streams, to collect statistics and aggregate them in all grouped streams, or to establish a certain topology affecting also all grouped streams.

When the media in each of the grouped streams has to traverse from/to one termination to another termination, depending on the semantics of the grouping, not all streams will necessary traverse. The semantics of the grouping may imply that only one of them is chosen at a time; this choice may change dynamically without requiring MGC intervention.

In the following, an example is discussed with both-way or one-way connections between two or more streams in a first termination T1 to one stream in a second termination T2 of the first media resource point or MG 102.

Figure 2:
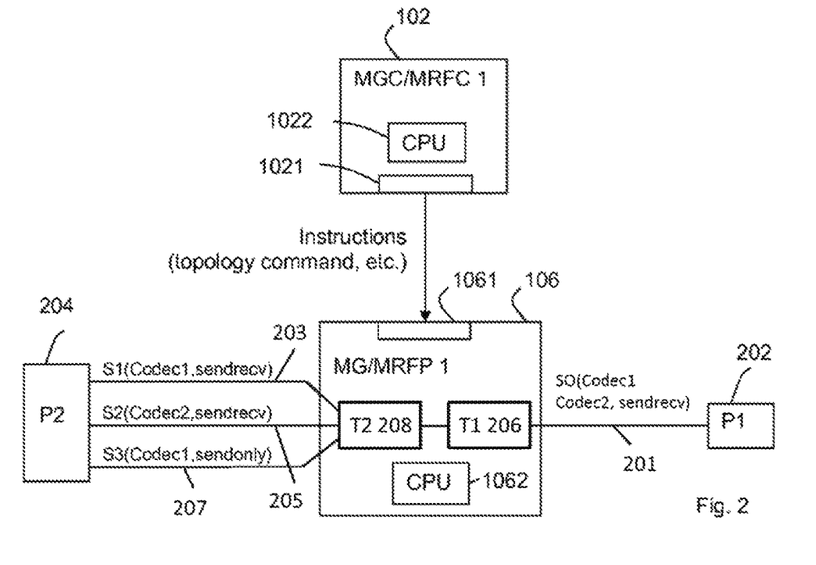
FIG. 2 shows a more detailed block diagram comprising a media resource controller and a media resource point involved in media stream grouping and action.

Thereto, FIG. 2 illustrates an arrangement comprising the first media resource controller 102, the first media resource point 106, a first party, P1, (device) 202 and a second party, P2, (device) 204, The media resource controller 102 comprises the first interface 1021 and a first processor 1022. The media resource controller 102 comprises the first H.248 interface 1021 and a first processor 1022. The first media resource point 106 comprises a second interface H.248 interface 1061 and a second processor 1062. Further, the first media resource point 106 comprises the first termination T1 206 and the second termination T2 208. The first H.248 interface 1021 is coupled to the second interface H.248 interface 1061. The first termination T1 206 is coupled to the first party 202 or first remote party P1, and the second termination T2 208 is coupled to the second party 204 or second remote party P2.

In a two party audio call, first termination T1 206 shall send and receive (from/to the outside of the context) one audio stream S0 201 with two payload types, corresponding to two different audio codecs, e.g. Codec1 and Codec2. At a time, the audio shall be encoded either with Codec1 or with Codec2. The remote party P1 202 may change the codec dynamically and deliberately. The second termination T2 208 may send and receive two audio streams S1 203 and S2 205, e.g. grouped with the FIO semantics according to RFC 5888. First stream S1 203 may use Codec1, and second stream S2 205 may use Codec2. In addition, second termination T2 208 may send (but in this example does not receive) third stream S3 207 to the outside of the context, by way of example also using Codec1. Third media stream S3 207 by way of example may also be grouped with the FID semantics to S1 203 and S2 205.

Thereto, according to embodiments of the invention, a topology group representative is sent from the MGC to the MG. In this example, S1 203 is chosen as representative identity, as both termination T1 206 and T2 208 handle S1 203 media stream. This command instructs the MG to perform an action on S1 203 in response to a further command. Of course, the stream representative may be chosen different to any of the individual streams.

The further command may comprise an indication to bidirectionally connect S1 203 to both terminations T1 206 and T2 208; i.e. the other streams S2 205 and S3 207 are terminated at Ts in this example. This command may look like (S1, T1, T2, bothway).

The expected behavior is as follows:

When first remote party P1 202 connected to the first terminal T1 206 sends media encoded with Codec1, it will be forwarded to S1 203 and S3 205 in T2 208 to the second party, P2 204, connected to the second terminal T2 208.

When first remote party P1 202 sends media encoded with Codec2, it will be forwarded to S2 205 in T2 208's remote party P2 204.

P2 204 will send media encoded either with Codec1 or with Codec2. The media will be received in T2 208 and forwarded to T1 206.

It may be noted that the direction attribute shown in FIG. 2 corresponds to the end-points in the MG, e.g. to terminations T1 206 and T2 208. Thus, S3 207 media flows only in direction from T2 208 to P2 204.

The above described topology instruction to describe the connectivity required above (as currently no topology mechanism for such connectivity is existing in H.248; with existing available mechanisms it is possible to command a connection of only S1 203 between T1 206 and T2 208).

Figure 3:
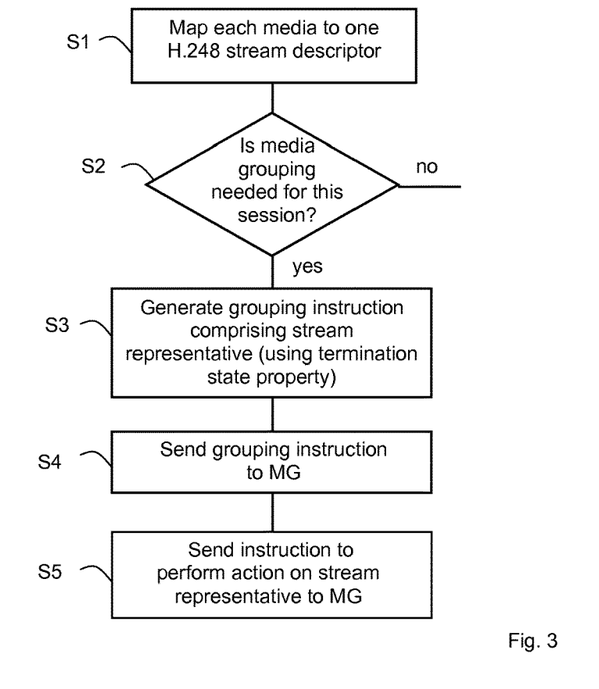
FIG. 3 shows a first flow chart for illustrating an exemplary sequence of steps performed by a media resource controller.

FIG. 3 shows an exemplary flow chart illustrating a generation of an SOP offer with a (multimedia) session description in response to grouping capabilities of a controlled media resource point 106 according to FIG. 1:

The first steps S1, S2, and S3 may be performed in advance to the sequence described in the steps S4-S5.

In the first step S1, the (first) media resource controller 102 (or any other node associated to the first media resource controller 102) maps the media of a multimedia session to each one H.248 stream descriptor.

In the second step S2, the media resource controller 102 determines, if a media grouping is needed (or recommended) for this multimedia session.

If yes, in a third step S3, the media resource controller 102 generates a grouping instruction to group a plurality of media to be handled by a certain termination of the controlled media resource point 106, in the following being referred to as the first termination T1 206 of the (first) media resource point 106 (e.g. using a termination state property as discussed below) to be sent to the media resource point 106.

In a fourth step S4, the media resource controller 102 generates an instruction to prepare for an action to be performed at the media resource point 106 on the media streams being grouped together.

Such instruction may comprise generating a group or stream representative enabling the media resource controller 102 to indicate to the media resource point 106 a virtual media stream of the termination that will represent the media group when requesting events, signals or statistics applicable to all streams of the group. The associated (virtual) stream identity may be different from all stream identities used by any of the termination streams.

With regards to topology, the media resource controller 102 is enabled to indicate to the media resource point 106 a virtual media stream of the termination that will represent the media group in relation to media streams of other terminations as defined by the corresponding topology descriptor. The associated stream identity may be the same as used in other terminations if a topology relationship has to be established to those terminations.

In a fifth step S5, the first media resource controller 102 transmits to the media resource point 106 an instruction to perform a certain action on the streams identified by the stream representative, e.g. to collect statistics as discussed above.

Figure 4:
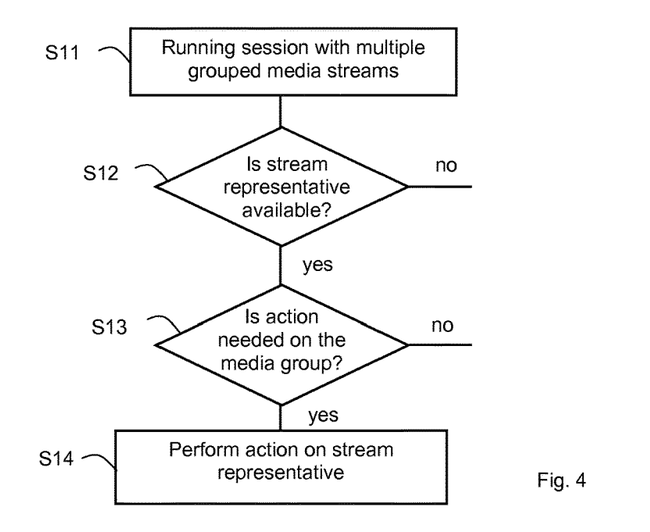
FIG. 4 shows a second flow chart for illustrating an exemplary sequence of steps performed by a media resource point.

FIG. 4 shows an exemplary flow chart illustrating action to be performed in a media resource point 106.

In a first step (of this embodiment) S11, the media resource point 106 is running a session with multiple streams being grouped as commanded e.g. according to FIG. 3.

In the second step (of this embodiment) S12, the media resource point 106 determines, if a media representative is available.

If yes, in a third step (of this embodiment) S13, the media resource point 106 determines, if an action has to be performed on the media group; a corresponding instruction may have been received from the first media resource controller 102.

If, yes, in a fourth step (of this embodiment) S14, the media resource point 106 performs the corresponding action.

A solution proposed according to embodiments of the invention comprises a definition of new properties on termination level. The new properties indicate the stream representative, if any, for each of the groupings applicable to the session. One proposed representative is applicable to signals, events and statistics. A further proposed representative may be applicable for topology. A reason to using a different stream number as representative for topology is to facilitate the operations, as for the topology representative, this stream number must exist in the other termination in order to establish a topology relationship.

Each property may be represented as a list of strings. Each member in the list may correspond to one member of the so-called "Group Semantics" property, listed in the same order.

Some exemplary properties definitions are listed below:
Property Name: Group Representative
Property ID: grouprep, (0x0002)
Description: This property allows the MGC to indicate to the MG a virtual media stream of the termination that will represent the media group when requesting events, signals or statistics applicable to all streams of the group The defined stream identity must not be used by any of the termination streams.

Figure 5A:
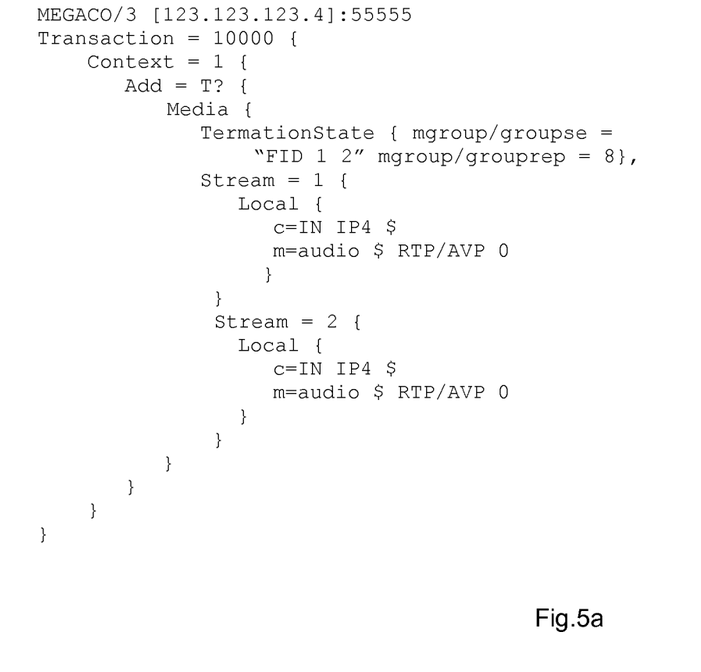
FIG. 5a, 5b show first exemplary instructions transmitted by a media resource controller.
Figure 5B:
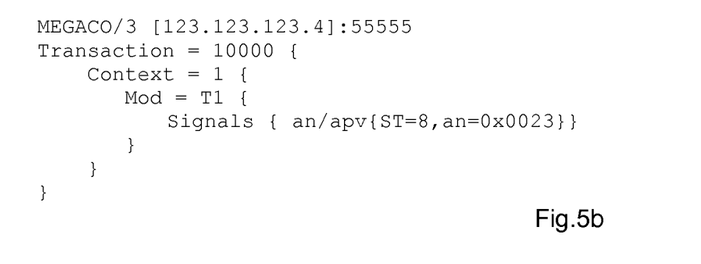

Type: Sub-list of integer
Possible values: Stream descriptor identity.
Default: None
Defined in: TerminationState
Characteristics: Read/Write
Stream Representative for Topology:
Property Name: Topology Group Representative
Property ID: groupreptop, (0x0003)
Description: This property allows the MGC to indicate to the MG a virtual media stream of the termination that will represent the media group in relation to media streams of other terminations as defined by the Topology descriptor. The defined stream identity must be the same as used in other terminations if a topology relationship has to be established to those terminations.
Type: Sub-list of integer
Possible values: Stream descriptor identity.
Default: None
Defined in: TerminationState
Characteristics: Read/Write In the following an example is given for applying signals, events and/or statistics to the group. Thereto, FIG. 5a shows an exemplary H.248 command wherein a MGC groups two audio media streams with the FID semantics when adding a new termination. By way of example a virtual stream 8 is selected as representative. FIG. 5b shows an exemplary H.248 command sent out by the MGC play the same announcement simultaneously on both audio media streams.

Figure 6A:
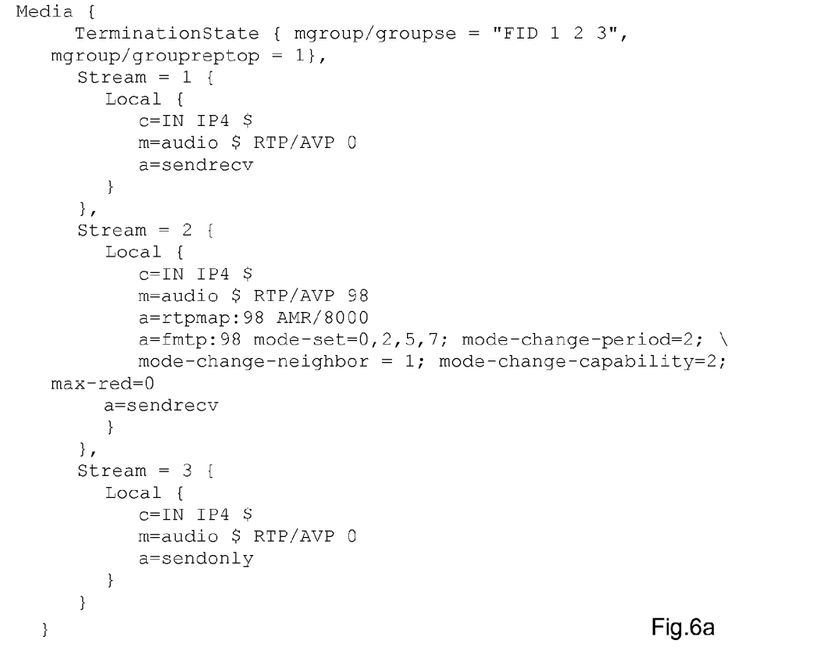
FIG. 6a, 6b show further exemplary instructions transmitted by a media resource controller.
Figure 6B:
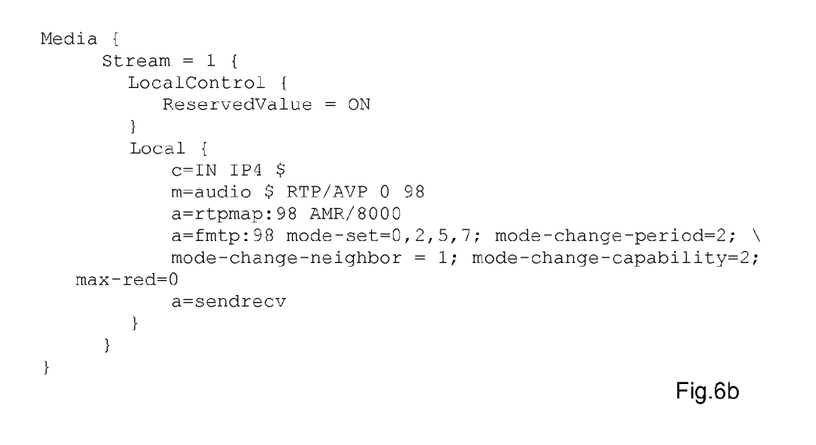

In the following, an exemplary topology description for the group to be used by the MGC is shown. Thereto, FIG. 6.a shows a media descriptor for the first termination T1, and FIG. 6.b shows a media descriptor for the second termination T2; the media descriptors may be included in an "Add" command.

The topology descriptor may comprise the terminations, directionality and stream identifier:
  Topology {T1, T2, BW (bothway), ST (stream)=1}

As discussed above, embodiments of the invention allow the MGC to order a MG to act simultaneously on the media streams of a selected group of streams independently of any adherence to one or different terminations of the MG. In other words, the one termination or the plurality of terminations of the MG may terminate each one or a plurality of media streams belonging to the grouped media streams and may additionally terminate one or a plurality of further media streams not being part of the grouped media streams.

Such action may be for example to play an audio or video announcement, to detect the reception of in-band digits (DTMF or telephony events), to order a collection and aggregation of statistics in several streams in a MG, for example the number octets received in several streams grouped by the BUNDLE semantics, and or to establish connectivity in a MG between two or more terminations when media grouping applies only at one termination or when different media groupings apply at different terminations.

The invention claimed is:

1. A method for controlling a media session involving a plurality of media streams within a communications network, wherein the communications network comprises a media resource node and a media control node controlling the media resource node, the method comprising the media control node:
determining that selected media streams out of the plurality of media streams are associated to each other in the media session;
generating a first instruction to group the determined selected media streams, the first instruction comprising a description packet for each of the determined selected media streams associated to a termination of the media resource node;
transmitting, to the media resource node, the first instruction to group the determined selected media streams; and
transmitting, to the media resource node, a second instruction to prepare for performing an action with respect to the determined selected media streams, wherein the second instruction comprises an indication of a media stream identifier representing the group of the determined selected media streams and an indication of the action to be performed.

2. The method of claim 1, wherein the first instruction comprises a list of media stream identifiers created at the media resource node.

3. The method of claim 2, wherein the media stream identifiers are integer numbers.

4. The method of claim 1, wherein the action to be performed comprises at least one of:
an instruction to play a signal in the selected media streams of the group;
an instruction to arm an event in the selected media streams of the group;
an instruction to collect statistics in the selected media streams; and
an instruction to collect statistics in the selected media streams and to aggregate the statistics.

5. The method claim 1, wherein the action to be performed comprises an instruction to establish a certain topology.

6. A method of claim 5, wherein the second instruction comprises a description of a certain topology, the description of the certain topology including a plurality of terminations of the media resource node.

7. The method of claim 1, wherein the first instruction comprises an information of a kind of grouping.

8. The method of claim 7, wherein the kind of grouping is one of the following:
synchronized play out of selected media streams;
alternative play out of selected media streams; or
alternative play out of selected media streams in response to a user instruction.

9. The method of claim 1, wherein the first and second instructions are sent in a suite of one or a plurality of H.248.1 commands.

10. The method of claim 1, wherein the determined selected media streams comprise an original digital representation and a replica representation.

11. The method of claim 10, wherein the replica representation is sent on request from a receiver.

12. The method of claim 1, wherein the first instruction is indicative of a purpose for the grouping.

13. The method of claim 1, wherein the selected media streams are a subset of all media streams handled by a particular termination of the media resource node.

14. A media control node for controlling a media session involving a plurality of media streams within a communications network, the media control node comprising:
processing circuitry configured to:
determine that selected media streams out of the plurality of media streams are associated to each other in the media session; and
generate a first instruction to group the determined selected media streams, the first instruction comprising a description packet for each of the determined selected media streams associated to a termination of the media resource node; and a transmitter configured to transmit instructions to the media resource node, the instructions comprising:
a first instruction to group the determined selected media streams; and
a second instruction to prepare for performing an action with respect to the determined selected media streams, wherein the second instruction comprises an identifier representing the group of determined selected media streams and an indication of the action to be performed.

15. A method for establishing a media session involving a plurality of media streams within a communications network, wherein the communications network comprises a media resource node and a media control node controlling the media resource node, the method comprising the media resource node:

receiving instructions to group selected media streams out of the plurality of media streams of the media session into the group of the selected media streams and to prepare for performing an action with respect to the selected media streams, wherein the instructions comprise:
a first instruction comprising a description packet for each of the selected media streams of the group of selected media streams that are associated to a termination of the media resource node;
a second instruction comprising an identifier representing the group of the selected media streams and an indication of the action to be performed;
in response to receiving the one or more instructions:
grouping of the selected media streams of the media session; and
performing the action.

16. A media resource node, comprising:
a receiver configured to receive instructions from a media control node to group selected media streams out of a plurality of media streams of a media session into a group of the selected media streams and to prepare for performing an action with respect to the selected media streams, wherein the instructions comprise:
a first instruction comprising a description packet for each of the selected media streams of the group of selected media streams that are associated to a termination of the media resource node;
a second instruction comprising an identifier representing the group of the selected media streams and an indication of the action to be performed; and
processing circuitry configured to:
group the selected media streams of the media session; and
prepare to perform the action.

17. A computer program product stored in a non-transitory computer readable medium for controlling a media session involving a plurality of media streams within a communications network; wherein the communications network comprises a media resource node and a media control node controlling the media resource node; the computer program product comprising software instructions which, when run on processing circuitry of the media control node, causes the media control node to:
determine that selected media streams out of the plurality of media streams are associated to each other in the media session; and
generate a first instruction to group the determined selected media streams, the first instruction comprising a description packet for each of the determined selected media streams associated to a termination of the media resource node; and
transmit, to the media resource node, the first instruction to group the determined selected media streams; and
transmit, to the media resource node, a second instruction to prepare for performing an action with respect to the determined selected media streams, wherein the second instruction comprises an indication of a media stream identifier representing the group of the determined selected media streams and an indication of the action to be performed.

18. A computer program product stored in a non-transitory computer readable medium for establishing a media session involving a plurality of media streams within a communications network; wherein the communications network comprises a media resource node and a media control node controlling the media resource node; the computer program product comprising software instructions which, when run on processing circuitry of the media resource node, causes the media resource node to:
receive instructions to group selected media streams out of the plurality of media streams of the media session into the group of the selected media streams and to prepare for performing an action with respect to the selected media streams, wherein the instructions comprise:
a first instruction comprising a description packet for each of the selected media streams of the group of selected media streams that are associated to a termination of the media resource node;
a second instruction comprising an identifier representing the group of the selected media streams and an indication of the action to be performed; and
in response to the reception of the instruction:
group the selected media streams of the media session; and
perform the action.

* * * * *